United States Patent Office 2,983,740
Patented May 9, 1961

2,983,740

COMPOUNDS OF A GROUP IV-A METAL DIRECTLY BONDED TO TWO CYCLOPENTADIENYL NUCLEI AND TO AT LEAST ONE INORGANIC ANION AND THEIR PREPARATION

John C. Thomas, Wilmington, and Gerald M. Whitman, Hockessin, Del., assignors to E. I. du Pont de Nemours and Company, Wilmington, Del., a corporation of Delaware No Drawing. Filed June 15, 1953, Ser. No. 361,820

7 Claims. (Cl. 260—429.3)

This invention relates to organometallic derivatives of group IV-A metals. More particularly, this invention relates to new organometallic compounds of group IV-A metals of atomic number 22 through 72, i.e., titanium, zirconium and hafnium, in which the metal is bonded to carbon of at least two cyclic organic radicals.

This application is a continuation-in-part of our application Serial No. 310,116, filed September 17, 1952 and now abandoned.

Organometallic compounds are of considerable interest for catalytic and synthetic applications. Certain organometallics have achieved importance as antiknock agents for spark ignition engines. An example of such is tetraethyl-lead. Some organometallics have been employed as catalysts in polymerization, e.g., tetraethyllead. Other organometallics, such as the hydrocarbo-lithium and hydrocarbo-sodium compounds are useful in synthetic organic chemistry.

In view of the utility of organometallics, Gilman, "Organic Chemistry," John Wiley, New York, second ed. (1943) page 557 states that "Numerous attempts have been made to prepare organotitanium and organozirconium compounds, but without unequivocal success. Titanium and zirconium chlorides are reduced to lower halides and possibly to the metals in reactions with RMgX and RLi compounds."

It is an object of this invention to provide new organotitanium, organozirconium, and organohafnium compounds and a process for their preparation. A further object is to prepare new organometallic derivatives of cyclic organic compounds and more particularly organometallic compounds containing at least two cyclopentadienyl rings and a group IV-A metal. A still further object is to prepare dicyclopentadienyltitanium, dicyclopentadienylzirconium, and dicyclopentadienylhafnium compounds. Other objects will appear hereinafter.

These objects are accomplished by the following invention of group IV-A metal derivatives in which the metal has an atomic number of at least 22 and of not more than 72 and in which the metal atom is bonded directly to carbon of at least two carbocyclic radicals of five ring carbons and two nuclear conjugated ethylenic unsaturations, i.e., a carbocyclic radical whose nuclear carbons form only one ring and that a cyclo-pentadienyl ring, these carbocyclic radicals being attached to the metal through nuclear carbon. These group IV-A metal derivatives are generally obtained by reacting, under anhydrous conditions, a halide of a group IV-A metal of atomic number 22 through 72, e.g., titanium- or zirconium-tetrafluoride, chloride, or bromide with an organomagnesium halide, e.g., cyclopentadienylmagnesium chloride or bromide.

The preferred reaction is carried out under anhydrous conditions within the temperature range of −25° C. to 125° C., generally between 0° C. and 75° C. in an inert, liquid anhydrous medium, such as anhydrous benzene and anhydrous ether. The new organometallic products formed can be removed by crystallization, removal of solvent or organic diluent, or by sublimation to provide new compounds which have at least two cyclic organic radicals directly attached to a group IV-A metal of atomic number 22 through 72. The preferred new compounds are represented by the formula $R_n—M—X_{(4-n)}$ wherein R is a carbocyclic monovalent radical which is directly bonded by a ring carbon to the metal M, said radical having a five membered carbocycle with two conjugated ethylenic unsaturations, M is a group IV-A metal of atomic number 22 through 72, X is an anion and $n$ is a cardinal number of two to three and preferably two. Particularly preferred are compounds of the general formula

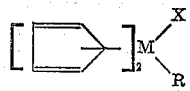

wherein R is selected from the class consisting of halogen and the radical

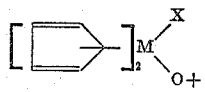

M is a group IV-A metal having an atomic number of at least 22 and of not more than 72, and X is halogen.

The following examples, in which all parts are by weight unless otherwise stated, illustrate specific embodiments of the preparation of the new compounds of this invention.

EXAMPLE I

*Preparation of a dicyclopentadienyltitanium bromide*

Ethylmagnesium bromide was prepared by adding a solution of 46.7 g. (0.424 mole) of ethyl bromide in 46.7 g. of anhydrous benzene to 10.2 g. (0.424 mole) of magnesium turnings in 105 ml. of anhydrous ether with stirring. The addition of ethyl bromide was carried out at such a rate that a smooth reflux was maintained by the heat of reaction. The addition required 40 minutes, and during this time the temperature of the mixture rose from 35° to 57° C. The mixture was then refluxed on a steam bath with stirring for 30 minutes, during which time the temperature rose to 67° C.

The steam bath was removed, and 28 g. (0.424 mole) of freshly distilled cyclopentadiene in 28 g. of anhydrous benzene was added over a period of about one minute. The mixture was stirred for 20 minutes without external heating, during which time the liquid refluxed at a gradually decreasing rate and the temperature dropped to 48° C. The mixture was refluxed for 15 minutes on a steam bath, during which time the temperature rose to 64° C. The steam was shut off, and a solution of 39 g. (0.106 mole) of titanium tetrabromide in 70.5 g. of anhydrous benzene was added over a period of 9 minutes, with stirring, at such a rate that a steady reflux was maintained. The rate of addition was gradually increased during the 9-minute period, and the temperature rose to 71° C. The mixture was refluxed with stirring for 15 minutes at 70–72° C. The heat was then removed, the stirring was stopped, and the mixture was allowed to stand at room temperature overnight. Crystals appeared in the mixture soon after the heating and stirring were stopped.

The mixture was filtered, and the solid was washed twice on the filter with benzene and dried. The solid was added in portions to a stirred mixture in 250 ml. of concentrated hydrochloric acid, 500 ml. of water, and 750 g. of cracked ice at −10° C. The mixture was stirred for one hour, by which time the ice had melted and the temperature had risen to 10° C. The mixture was filtered, and the reddish-brown solid was washed thoroughly with water. The solid was added to 800 ml. of water. The mixture was heated to 80° with constant agitation and filtered with suction at this temperature. The filtrate was a clear, orange liquid. Extraction with hot water was repeated. This time the filtrate was nearly colorless. The solid was washed twice with water and dried. The dry, orange solid weighed 4.5 g. It was recrystallized from 215 ml. of dry chlorobenzene, the hot solution being allowed to cool slowly without agitation. There was thus obtained 3.5 g. of glistening orange crystals, which were slightly soluble in organic solvents and insoluble in water.

ANALYSIS

| | Calculated for $(C_5H_5)_2TiBr-O-Ti(C_5H_5)_2Br$ | Found |
|---|---|---|
| C | 45.2 | 45.2 |
| H | 3.8 | 3.9 |
| Ti | 18.0 | 18.0 |
| Br | 30.0 | 30.0 |
| Mg | 0 (Emission spes.) | 0.01 |
| M.W. | 532 (Ebull. in benzene) | 605 |

The product melted and decomposed simultaneously at about 240° C. It showed no tendency to sublime up to 225° C./1 mm. It was surprisingly stable to hydrolysis; it was apparently unattacked by boiling water and boiling 10% aqueous sodium hydroxide. It appeared to react slowly with boiling 1:1 hydrochloric acid, and more rapidly with boiling 1:1 nitric acid. It dissolved in concentrated nitric acid and concentrated sulfuric acid at room temperature and could not be recovered on dilution of these solutions with water.

EXAMPLE II

*Preparation of a dicyclopentadienyltitanium chloride*

Butylmagnesium chloride was prepared as follows: Enough of a solution of 46.3 g. (0.5 mole) of n-butyl chloride, 46.3 g. of anhydrous benzene, and 125 ml. of anhydrous ether was added to 12 g. (0.5 mole) of magnesium turnings to cover the turnings. A crystal of iodine was added, and the mixture was stirred slowly at room temperature for 20 minutes. It was then refluxed gently on a steam bath with stirring for 7 minutes, at the end of which time the reaction was proceeding rapidly. Heating was stopped, and the mixture was allowed to reflux from the heat of reaction with stirring for 8 minutes. At the end of this time the refluxing had moderated considerably, and the temperature of the mixture was 54° C. The remainder of the n-butyl chloride solution was then added dropwise with stirring at such a rate that a smooth reflux was maintained by the heat of reaction. The addition required 30 minutes, and during this time the temperature remained at 54° C. The mixture was then refluxed on a steam bath with stirring for one hour, at the end of which time the temperature was 53° C.

The mixture was allowed to cool to a temperature of 50° C., and a solution of 33 g. (0.5 mole) of freshly distilled cyclopentadiene in 33 g. of anhydrous benzene was added over a period of about one minute with stirring. The mixture was stirred for 30 minutes without external heating, during which time the liquid refluxed at a gradually decreasing rate and the temperature remained at 49° C. The mixture was refluxed with stirring on a steam bath for 20 minutes, during which time the temperature rose to 58° C. Heating was stopped, and a solution of 23.6 g. (0.125 mole) of titanium tetrachloride in 75 ml. of anhydrous benzene was added dropwise with stirring over a period of 7 minutes. At the start of the addition, the mixture immediately became dark brown and refluxed vigorously. As the addition was continued, the color changed to green and then back to brown, and the rate of reflux gradually diminished. The final temperature of the mixture was 62° C. The mixture was refluxed for 5 minutes with stirring and was then allowed to stand at room temperature overnight.

The mixture was filtered, and the solid was washed on a filter with benzene and air-dried. The solid was added in portions to a stirred mixture of 250 ml. of concentrated hydrochloric acid, 500 ml. of water, and 750 g. of cracked ice at $-5°$ C. The mixture was stirred until the ice had melted and then was filtered. The solid was washed with water and dried. It was extracted in succession with 150 ml., 150 ml., and 100 ml. of methylene chloride. The combined methylene chloride extracts were evaporated to dryness on a steam bath. The residue was heated with 350 ml. of water at 90–95° C. for 10 minutes, and the mixture was filtered. The solid was washed with water, extracted again in the same way with 350 ml. of water, and dried. The dry solid was added to 100 ml. of chlorobenzene, and the mixture was heated to boiling and filtered while hot. After cooling, filtering, washing, and drying, there was obtained 0.5 g. of orange leaflets, which were slightly soluble in organic solvents and insoluble in water. The product melted and decomposed simultaneously at about 240° C. It was apparently unattacked by boiling water.

ANALYSIS

| | Found | Calculated for $[(C_5H_5)_2TiCl]_2O$ |
|---|---|---|
| C | 54.2 | 54.2 |
| H | 4.9 | 4.6 |
| Ti | 21.3 | 21.6 |
| Cl | 17.9 | 16.0 |

EXAMPLE III

*Preparation of two different dicyclopentadienyltitanium chlorides*

Cyclopentadienylmagnesium chloride was prepared by the use of butylmagnesium chloride as described in Example II. The solution of titanium tetrachloride in anhydrous benzene was added to the Grignard solution over a period of 25 minutes with stirring, the temperature being held at 25–30° C. by cooling with ice. The mixture was stirred for one hour at room temperature and then allowed to stand overnight at room temperature.

The product was worked up as described in Example II through the extraction with methylene chloride and evaporation of the extracts to dryness. The solid product thus obtained was recrystallized from chlorobenzene. The recrystallized product was split into two equal parts, which were treated as follows:

(1) The first half was treated with 150 ml. of water at 90–95° C., and the cloudy, pale yellow, supernatant liquid was decanted. The residual orange crystals were again extracted with hot water and were washed with water and dried. They were then recrystallized from chlorobenzene to give a product which was apparently unaffected by boiling water and which had the same X-ray diffraction pattern as the product described in Example II.

*Analysis.*—Cal. for $[(C_5H_5)_2TiCl]_2O$: C, 54.2; H, 4.6. Found: C, 54.1; H, 4.8.

(2) The second half was heated under a water-cooled glass surface at 190–200° C./2 mm. until no more material sublimed onto the cool surface. The red, crystalline sublimate was recrystallized from chlorobenzene. There was obtained a crop of large, dark red needles. This compound did not react with water at 25° C. but was decomposed by water at 90–95° C.

*Analysis.*—Calc. for $(C_5H_5)_2TiCl_2$: C, 48.2; H, 4.0; Ti, 19.2; Cl, 28.5; M.W., 249. Found: C, 48.3; H, 4.3; Ti, 19.1; Cl, 28.4; M.W. 254 (ebull. in benzene).

In the same manner by the use of the analogous bromide reactants, the corresponding bromides can be obtained having the formulas:

$[(C_5H_5)_2TiBr]_2O$ and $(C_5H_5)_2TiBr_2$

EXAMPLE IV

Preparation of dicyclopentadienylzirconium dichloride

Cyclopentadienylmagnesium chloride (0.5 mole) was prepared via n-butylmagnesium chloride as described in Example II. The suspension of the Grignard reagent in anhydrous benzene and anhydrous ether was added in portions with stirring to a suspension of 40 g. (0.17 mole) of zirconium tetrachloride in anhydrous benzene. The temperature was kept at 25–30° C., except just after the addition of the first portion of cyclopentadienylmagnesium chloride, when it rose to 45° C. for a short time. The dark brown mixture was stirred overnight at room temperature. It was filtered, and the solid (A) on the filter was washed once with benzene and air-dried.

The combined filtrate and washing was immediately evaporated as far as possible on a steam bath. Some solid precipitated during this process. The residue was a pale orange-brown mixture of a solid and an oil. It was digested on a steam bath with excess n-hexane, and the mixture was cooled and filtered. The solid was washed with n-hexane, and the digestion in hexane was repeated. The air-dried solid was added to a mixture of 100 ml. of concentrated hydrochloric acid, 200 ml. of water, and 300 g. of cracked ice with stirring at −5° C. The mixture was stirred until the ice had melted and was then filtered. The solid (B) was washed with cold water and thoroughly dried. The solid (A) that was separated in the filtration of the original reaction mixture was treated similarly with cold, dilute hydrochloric acid and dried.

Solid (B) (8 g. of a tan powder) was heated under a water-cooled glass surface at 195–200° C./1–2 mm. until no more sublimate condensed on the cold surface. There was thus obtained 2.5 g. of a very slightly colored sublimate. Solid (A) (9.5 g. of a tan powder) was treated similarly to give 1.6 g. of sublimate. Recrystallization of 1 g. of the sublimate from a large volume of cyclohexane gave 0.64 g. of dicyclopentadienylzirconium dichloride in the form of colorless crystals.

*Analysis.*—Calcd. for $(C_5H_5)_2ZrCl_2$: C, 41.09; H, 3.45; Cl, 24.26; Zr, 31.21; M.W., 292. Found: C, 41.09; H, 3.93; Cl, 25.63; Zr, 31.37; M.W., 299 (Ebullioscopically in toluene).

EXAMPLE V

Preparation of dicyclopentadienyltitanium dichloride

Cyclopentadienylmagnesium chloride was prepared in the usual manner from 114.7 g. (4.71 moles) of magnesium turnings, 463 g. (5 moles) of n-butyl chloride in 300 ml. of benzene and 1 liter of anhydrous ether, and 330 g. (5 moles) of cyclopentadiene in 330 ml. of benzene. To this mixture was added a solution of 448 g. (2.36 moles) of titanium tetrachloride in 1450 ml. of benzene over a period of 2⅓ hours at 15–23° C. with stirring. The mixture was allowed to stand overnight and was filtered.

The crude red solid was washed with 1200 ml. of benzene and air-dried. It was added in portions with stirring to a mixture of 1 liter of concentrated hydrochloric acid, 2 liters of water, and 4 liters of cracked ice. The mixture was allowed to stand for 30 minutes and filtered. The solid was washed with 1 liter of water and air-dried. There was thus obtained 494.7 g. of a red solid. An additional 34 g. of crude product was obtained from the combined filtrate and washings by extraction with methylene chloride.

From the 528.7 g. of crude product, 276.6 g. was separated by extraction with 9250 ml. of methylene chloride at room temperature and evaporation of the extracts to dryness. Recrystallization of 100 g. of this material from 2750 ml. of chlorobenzene yielded 77.9 g. of pure dicyclopentadienyltitanium dichloride having the same X-ray diffraction pattern as the product described in Part 2 of Example III. Ninety-eight percent of the 528.7 g. of crude product could be separated by extraction with methylene chloride and recovered as crude dicyclopentadienyltitanium dichloride.

EXAMPLE VI

Arylation of dicyclopentadienyltitanium dichloride

To a solution of 5 g. (0.02 mole) of dicyclopentadienyltitanium dichloride in 400 ml. of water and 20 ml. of concentrated hydrochloric acid was added 5 g. of copper powder. The mixture was cooled to 2.5° C. and allowed to stand for about three hours. To this mixture was added with stirring over a period of one and one-half hours a solution of p-chlorophenyldiazonium chloride (0.16 mole of p-chloroaniline in 40 ml. of concentrated hydrochloric acid and 120 ml. of water diazotized with sodium nitrite). During the addition a brown precipitate was formed and nitrogen gas was evolved. The brown solid was removed by filtration and heated under vacuum at 125° C. to remove p-dichlorobenzene which sublimed in water. The non-volatile brown residue was extracted portionwise with 1 liter of ether and the residue was discarded. Evaporation of the dried ether solution to a volume of 50 ml. gave 1.27 g. of orange crystals which were recrystallized from benzene to give 0.91 g. of orange needles (M.P. 186–188° C.).

*Analysis.*—Calcd. for $C_{28}H_{22}TiCl_5$: C, 57.90; H, 3.31; Cl, 30.6. Found: C, 57.88, 57.47; H, 3.43, 3.44; Cl, 28.63, 28.90. This indicates the introduction of three p-chlorophenyl groups per molecule of dicyclopentadienyltitanium dichloride.

EXAMPLE VII

Preparation of dicyclopentadienyltitanium difluoride

To a solution of 1.25 g. (0.005 mole) of dicyclopentadienyltitanium dichloride in 60 ml. of distilled water was added dropwise a solution of 1.27 g. (0.01 mole) of silver fluoride in 30 ml. of distilled water. A white precipitate of silver chloride was formed, and it was removed by filtration. The filtrate was concentrated in vacuo (50° C.) to a volume of ca. 64 ml. at which point a yellow crystalline precipitate was observed. This was removed by filtration. The filtrate was further evaporated to a volume of 35 ml. and an additional quantity of yellow solid was removed. The crude product (0.46 g.) was recrystallized from 16 ml. of chlorobenzene to give 0.29 g. of bright yellow needles which decomposed without melting at 250–280° C.

*Analysis.*—Calcd. for $C_{10}H_{10}TiF_2$: C, 55.58; H, 4.66. Found: C, 54.79, 55.37; H, 4.63, 4.83.

EXAMPLE VIII

Preparation of dicyclopentadienyltitanium difluoride

A solution of 12.45 g. (0.05 mole) of dicyclopentadienyltitanium dichloride in 400 ml. of distilled water was prepared by heating the mixture rapidly to 92° C. and then cooling quickly to room temperature. To this was added over a period of 38 minutes a solution of 0.1 mole of silver fluoride in 100 ml. of water (prepared from 4.16 g. of 48% HF and 13.79 g. of silver carbonate made up to 100 ml.). The precipitated silver chloride was removed by filtration and the filtrate was concentrated at the water pump to a volume of 234 ml. At this point a yellow crystalline solid had separated and it was filtered off and dried in air. The crude solid (2.05 g.) was recrystallized from 100 ml. of chlorobenzene to give 1.40 g. of deep yellow fluffy needles of dicyclopentadienyltitanium difluoride.

*Analysis.*—Calcd. for $C_{10}H_{10}TiF_2$: C, 55.58; H, 4.66; Ti, 22.16; Found: C, 55.61; H, 5.00; Ti, 19.77; F, 18.0, 19.5.

EXAMPLE IX

Preparation of dicyclopentadienyltitanium difluoride

A solution of ethylmagnesium bromide was prepared in the usual manner from 7.8 g. (0.32 atoms) of magnesium in 100 ml. of ether and 35.2 g. (0.32 mole) of ethylbromide in 35 ml. of benzene. To this solution was added dropwise a solution of 21.2 g. (0.32 mole) of cyclopentadiene in 25 ml. of benzene, and the mixture was heated at reflux for one-half hour. An Erlenmeyer flask containing 10 g. (0.08 mole) of titanium tetrafluoride was attached to the apparatus by Gooch tubing and the solid was added in small portions to the solution of the Grignard reagent. After all the tetrafluoride was added, the mixture was heated at reflux for 2.25 hours. The cooled reaction mixture was poured onto about 250 ml. of cracked ice and aqueous hydrofluoric acid in a stainless steel beaker and allowed to stand overnight. The mixture was filtered to remove the precipitated solids. The filtrate probably contained substantial amounts of the desired product but was not worked up.

The residue was slurried with about 250 ml. of distilled water and again filtered. This filtrate was extracted with methylene chloride in a continuous extractor for 18 hours, and the extract was dried and evaporated to dryness. There was thus obtained a yellow solid which recrystallized readily from chlorobenzene to give 0.13 g. of fluffy yellow needles of dicyclopentadienyltitanium difluoride whose infrared spectrum was identical with that of the material prepared in Example VIII.

It will be understood that the above examples are merely illustrative and that the invention broadly comprises the production of organometallic compounds in which a group IV–A metal of atomic number 22 through 72 is directly bonded to nuclear or ring carbons of cyclic organic radicals. Although the cyclopentadienyl radical is particularly suited for reasons of availability and reactivity, this invention is not limited to this particular radical.

Groups that can be present on the ring carbons include ketone such as the acetyl group, carboxylic acids and esters, cyano, carbonamide, hydroxy, hydrocarbon including both aryl and alkyl groups, halogen and halogenated hydrocarbon. It is generally preferred that the compounds employed have substituents on no more than four of the nuclear carbons although from a theoretical viewpoint, the number of substituents on the nuclear atoms can be as high as the number of such nuclear carbons. Particularly preferred are the cyclic hydrocarbons including the unsaturated carbocyclic compounds which have alkyl or aryl groups on the nucleus and of these those having five carbons in the ring are preferred, e.g. 1,3-dimethylcyclopentadiene and 1,3-diphenylcyclopentadiene.

The compounds thus embraced by this invention have titanium, hafnium or zirconium bonded directly to carbon of at least two cyclic organic radicals. These group IV–A metals are tetravalent and have at least two of the valences attached to carbon of the cyclic radicals. In general, at least one of the valences of the metal is satisfied by an inorganic anion. The examples illustrate the preparation of compounds having halide anions, however compounds having other anions are obtainable directly or by suitable ionic conversions from the halides. Inorganic anions that can be present include halide, nitrate, bromate, sulfate, phosphate, ferrocyanide, ferrochloride ($FeCl_4^-$), sulfonate, carbonate, and carboxylates, e.g., acetate and propionate.

Compounds specifically included in the scope of this invention in addition to those of the examples are bis(methylcyclopentadienyl)titanium dibromide, bis(phenylcyclopentadienyl)zirconium sulfate, bis(cyclohexylcyclopentadienyl)titanium dichloride, bis(ethylcyclopentadienyl)hafnium dichloride, and cyclopentadienyl(ethylcyclopentadienyl)titanium dichloride.

The compounds of this invention can be obtained by the reaction of metal derivatives of the parent organic compound with the halides, alkoxides, or acylates of the group IV–A metals or by direct reaction of the neutral organic molecules with metals or their oxides or salts at high temperatures.

A particularly desirable method for the preparation of the compounds of this invention involves the reaction under anhydrous conditions of a group IV–A metal halide, i.e., titanium, zirconium, or hafnium fluoride, chloride, bromide, or iodide with an organomagnesium halide, e.g., cyclopentadienylmagnesiumchloride, bromide or iodide (i.e., a halide of atomic number of at least 17).

A specific embodiment of this invention comprises reacting a cyclopentadienylmagnesium halide of chlorine, bromine, or iodine with a titanium, zirconium, or hafnium tetrahalide under anhydrous conditions at a temperature of 0° C. to 150° C. to form cyclopentadienyltitanium, zirconium, or hafnium compounds which have the metal directly bonded to carbon of two cyclopentadiene radicals and to at least one halogen. The compounds that are obtained include those of the structure

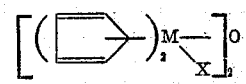

and

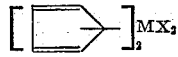

wherein M is titanium, zirconium, or hafnium and X is a monovalent anion, preferably inorganic and generally halogen.

The structural formulas for the titanium compounds are as follows:

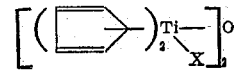

and

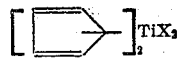

wherein X is a monovalent anion, preferably halogen.

The structural formulas for the zirconium compounds are as follows:

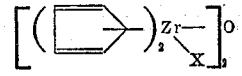

and

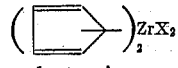

wherein X is a monovalent anion, preferably halogen.

The corresponding hafnium compounds have the formulas

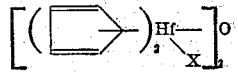

and

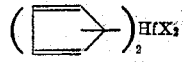

wherein X is a monovalent anion, preferably halogen.

The titanium compounds are the most readily obtained and are preferred, particularly the dicyclopentadienyltitanium dihalides, such as the dicyclopentadienyltitanium dichloride and dicyclopentadienyltitanium dibromide.

The cyclopentadienylmagnesium halide used in this reaction can be either the chloride, bromide, or iodide. It is readily prepared by the reaction of cyclopentadiene with a lower alkylmagnesium halide, preferably the methyl-, ethyl-, or propyl- or butylmagnesium bromide, chloride or iodide.

The titanium, zirconium, or hafnium tetrahalide used in the reaction can likewise be the fluoride, bromide, chloride, or iodide, with the chloride being preferred.

The oxygen containing organic halides

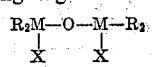

are assumed to result from the reaction of a cyclopentadienylmagnesium halide with $X_3M\text{—}O\text{—}MX_3$, wherein M is titanium, zirconium or hafnium, which latter compound is presumed to arise from the presence of traces of water in the group IV-A metal tetrahalide. The proportion of cyclopentadienylmagnesium halide to the titanium, zirconium or hafnium tetrahalide is not critical. The reaction uses at least two moles of cyclopentadienylmagnesium halide to 1 mole of titanium or zirconium tetrahalide and the two reactants can be used in such proportion although an excess of either does not adversely affect the reaction.

The reaction is conveniently carried out at temperatures of 0–100° C. under substantially atmospheric pressure. A temperature of at least —25° C. should be used and it is not advisable to exceed a temperature of 125° C. appreciably. A temperature between 0° C. and 75° C. is preferred, with room temperatures, e.g., 20–35° C. most useful. At these temperatures both products are obtained. Elevated temperatures, such as reflux temperature, generally give lower yields of the dicyclopentadienylmetal dihalides.

The reaction is carried out under anhydrous conditions. Normally, the cyclopentadienylmagnesium halide is prepared in an organic solvent. It is preferred to carry out the reaction in the presence of an inert mutual solvent for the reactants, such as anhydrous benzene.

Alternately, the compounds of this invention can be obtained by the reaction of a cyclopentadienylsodium or cyclopentadienyllithium compound with a desired anhydrous group IV-A metal halide. The sodium or lithium compounds are obtained by reaction of cyclopentadiene with an alkyl- or aryl-sodium or -lithium compound.

Separation of the cyclopentadienyltitanium, zirconium, or hafnium compounds can be effected by crystallization, removal of solvents, or sublimation.

The cyclopentadienyltitanium, zirconium, and hafnium compounds of this invention can be used as antiknock agents in fuels for spark ignition engines. They are also useful as catalysts for organic reactions and can be employed as intermediates in the production of other organic compounds.

As many apparently widely different embodiments of this invention may be made without departing from the spirit and scope thereof, it is to be understood that this invention is not limited to the specific embodiments thereof except as defined in the appended claims.

We claim:

1. A compound of the formula

wherein R is a member of the group consisting of cyclopentadienyl, methylcyclopentadienyl, dimethylcyclopentadienyl, ethylcyclopentadienyl, cyclohexylcyclopentadienyl, phenylcyclopentadienyl and diphenylcyclopentadienyl radicals, X is a halogen, and R′ is selected from the group consisting of X and the monovalent radical

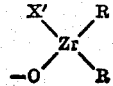

wherein R is as defined above and X′ is a halogen of the same atomic number as X.

2. A compound of the formula $$R_2ZrX_2$$

wherein R is a member of the group consisting of cyclopentadienyl, methylcyclopentadienyl, dimethylcyclopentadienyl, ethylcyclopentadienyl, cyclohexylcyclopentadienyl, phenylcyclopentadienyl and diphenylcyclopentadienyl radicals and X is a halogen.

3. Dicyclopentadienylzirconium dichloride of the formula $$R_2ZrCl_2$$

wherein R is the cyclopentadienyl radical.

4. An organo-zirconium compound having the empirical formula:

$$(C_5H_5)_2ZrX_2$$

where X is halogen and $C_5H_5$ is cyclopentadienyl.

5. The process which comprises reacting, under anhydrous conditions, a zirconium tetrahalide with a cyclopentadienylmagnesium halide in which magnesium is directly bonded to halogen having an atomic number of at least 17 and is further directly bonded to a cyclopentadienyl radical of the group consisting of cyclopentadienyl, methylcyclopentadienyl, dimethylcyclopentadienyl, ethylcyclopentadienyl, cyclohexylcyclopentadienyl, phenylcyclopentadienyl and diphenylcyclopentadienyl radicals, and isolating from the reaction mixture an organozirconium compound in which zirconium is directly bonded to two halogen atoms of the same atomic number and is further directly bonded to two of said cyclopentadienyl radicals.

6. A process which comprises reacting, under anhydrous conditions, a zirconium tetrahalide with cyclopentadienylmagnesium halide in which magnesium is directly bonded to halogen having an atomic number of at least 17 and is further directly bonded to the cyclopentadienyl radical, and isolating from the reaction mixture an organozirconium compound in which zirconium is directly bonded to two halogen atoms of the same atomic number and is further directly bonded to two cyclopentadienyl radicals.

7. A process which comprises reacting, under anhydrous conditions, zirconium tetrachloride with cyclopentadienylmagnesium chloride, and isolating from the reaction mixture dicyclopentadienylzirconium dichloride.

References Cited in the file of this patent

Journal Chem. Soc. (Lordan) (1930), pp. 463–7.
Journal Chem. Soc. (Lordan) (1930), pp. 2426–30.
Gilman Organic Chemistry, vol. 1, 2nd Ed. 1943, pg. 557.
Kealy et al.: Nature, vol. 168, Dec. 15, 1951, p. 1039–40.
Herman et al.: Journal of American Chemical Society, vol. 74, May 20, 1952, p. 2693.
Wilkinson et al.: Journal of American Chemical Society, vol. 75, Feb. 20, 1953, pp. 1011–12.
Herman et al.: Journal of American Chemical Society, vol. 75, Aug. 20, 1953, pp. 3877–81.

UNITED STATES PATENT OFFICE
CERTIFICATE OF CORRECTION

Patent No. 2,983,740

May 9, 1961

John C. Thomas et al.

It is hereby certified that error appears in the above numbered patent requiring correction and that the said Letters Patent should read as corrected below.

Column 2, line 21 to 24, the right-hand portion of the formula should appear as shown below instead of as in the patent:

$$M\genfrac{}{}{0pt}{}{\diagup X}{\diagdown O-}$$

column 6, line 69, after "22.16" insert -- F, 17.58. --; column 10, lines 51 and 52, for "(Lordan)", each occurrence, read -- (London) --.

Signed and sealed this 10th day of October 1961.

(SEAL)
Attest:

ERNEST W. SWIDER
Attesting Officer

DAVID L. LADD
Commissioner of Patents

USCOMM-DC